United States Patent [19]

Hegler

[11] 3,776,679

[45] Dec. 4, 1973

[54] APPARATUS FOR THE MANUFACTURE OF PLASTIC TUBING OF SPECIAL CROSS-SECTIONAL CONFIGURATION

[76] Inventor: Wilhelm Hegler, 8731 Oerlenbach, Germany

[22] Filed: Apr. 8, 1971

[21] Appl. No.: 132,471

[30] Foreign Application Priority Data
Dec. 11, 1970 Germany.................. P 20 61 027.9

[52] U.S. Cl.................. 425/325, 425/326, 425/405
[51] Int. Cl............................................ B29c 17/07
[58] Field of Search..................... 425/326, 325, 405; 264/210 R; 164/279

[56] References Cited
UNITED STATES PATENTS

| 1,139,889 | 5/1915 | Mellen | 164/279 |
|---|---|---|---|
| 2,091,348 | 8/1937 | Baldwin | 164/279 X |
| 3,188,690 | 6/1965 | Zieg | 425/327 |
| 3,286,305 | 11/1966 | Seckel | 425/326 |
| 3,391,424 | 7/1968 | Drossbach | 425/326 X |

FOREIGN PATENTS OR APPLICATIONS

| 253,762 | 4/1967 | Austria | 425/327 |
|---|---|---|---|
| 1,210,165 | 2/1966 | Germany | 425/327 |
| 1,242,848 | 6/1967 | Germany | 425/326 |

*Primary Examiner*—R. Spencer Annear
*Attorney*—Burgess, Dinklage & Sprung

[57] ABSTRACT

Improvements in the manufacture of transversely annular or helical corrugated thermoplastic tubing made by extruding a thermoplastic tubing and feeding the tubing into the jaws of revolving or recycling mold halves which come together about the tubing to form transverse corrugations therein, which improvement resides in bringing the mold halves about their recycle tracks or paths, particularly about the last arcuate path before entering the molding path, in such manner that their forward end, and particularly the outside edge of the forward end, has a smaller radius of curvature than does the rearward end, and particularly the outside edge of the rearward end.

19 Claims, 11 Drawing Figures

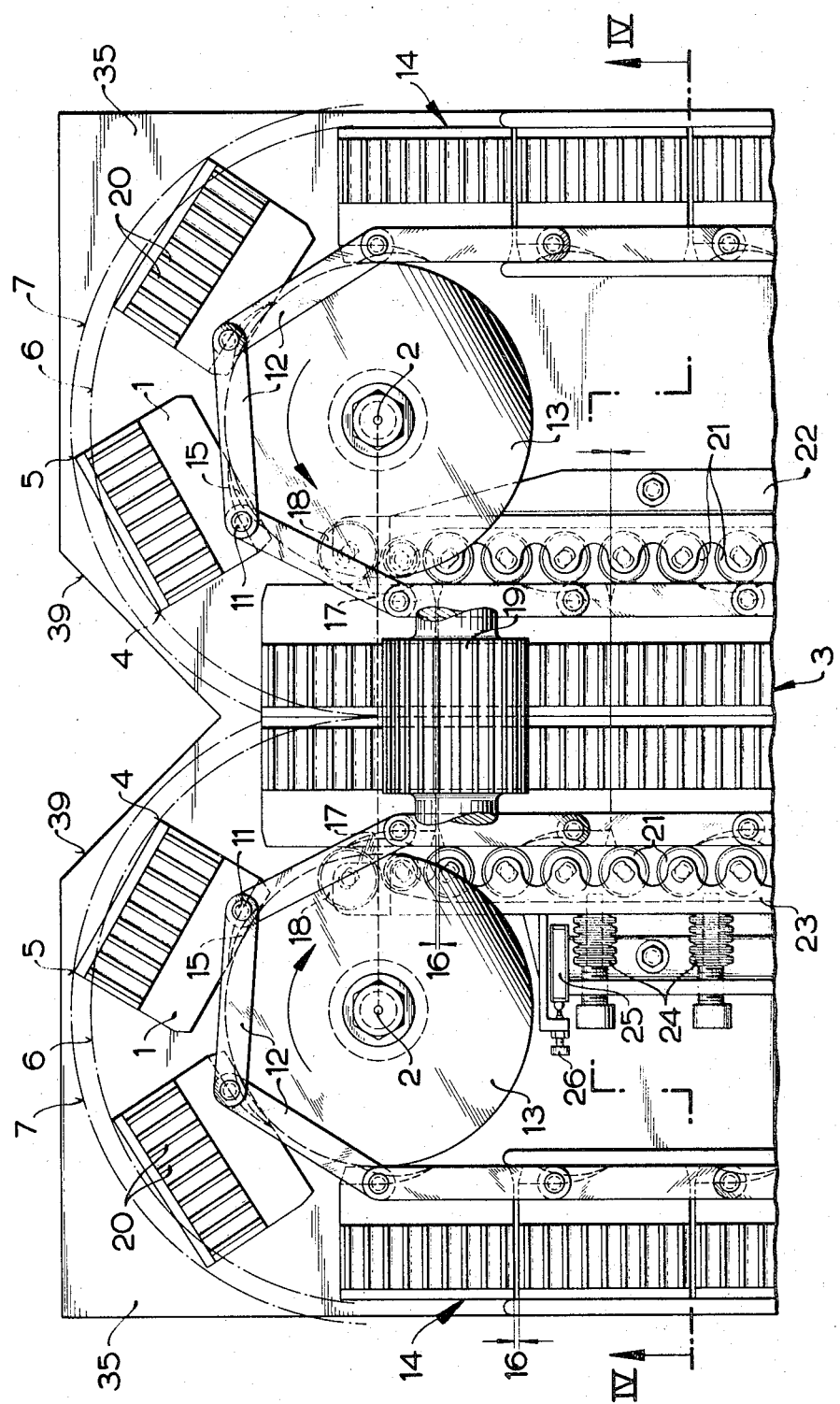

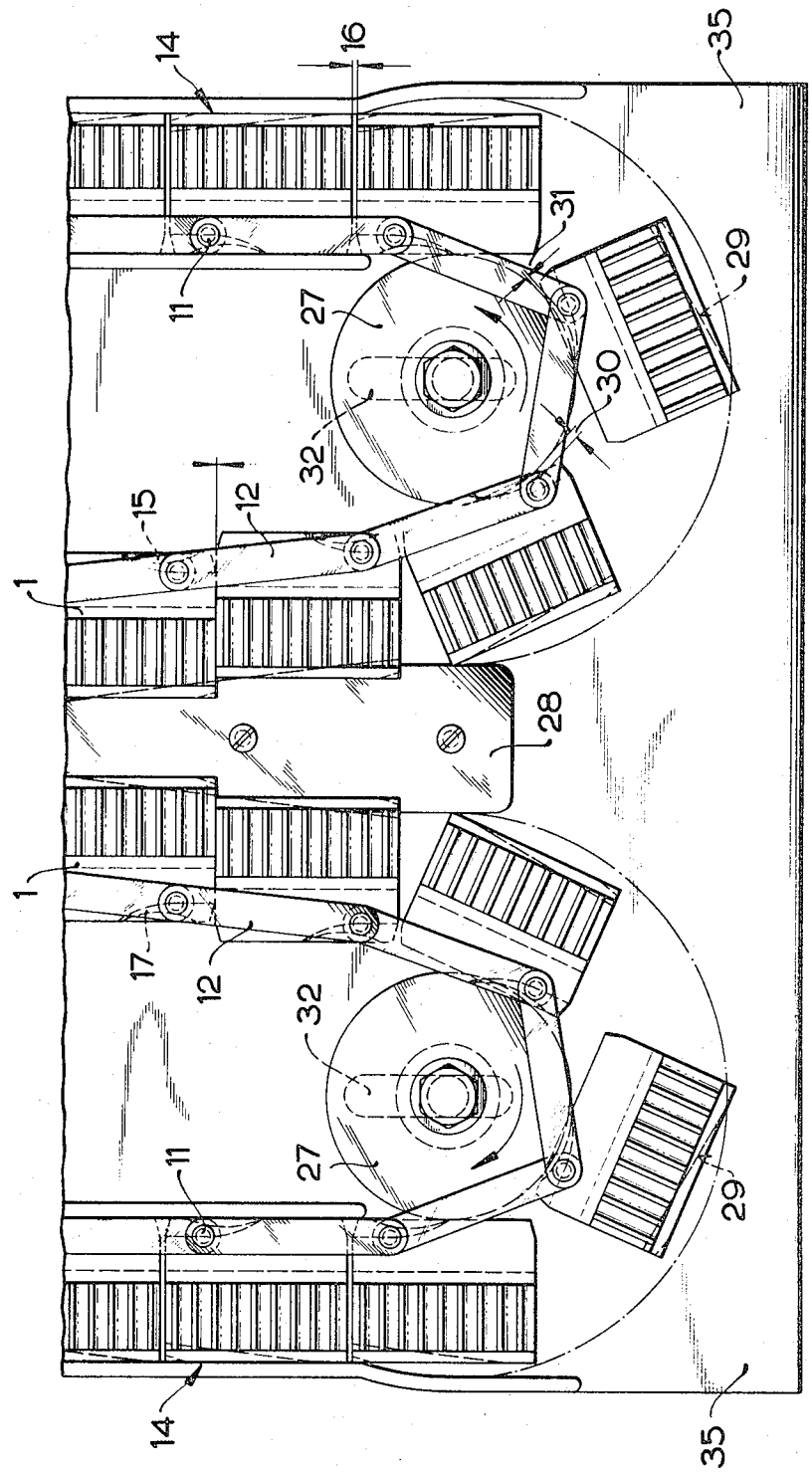

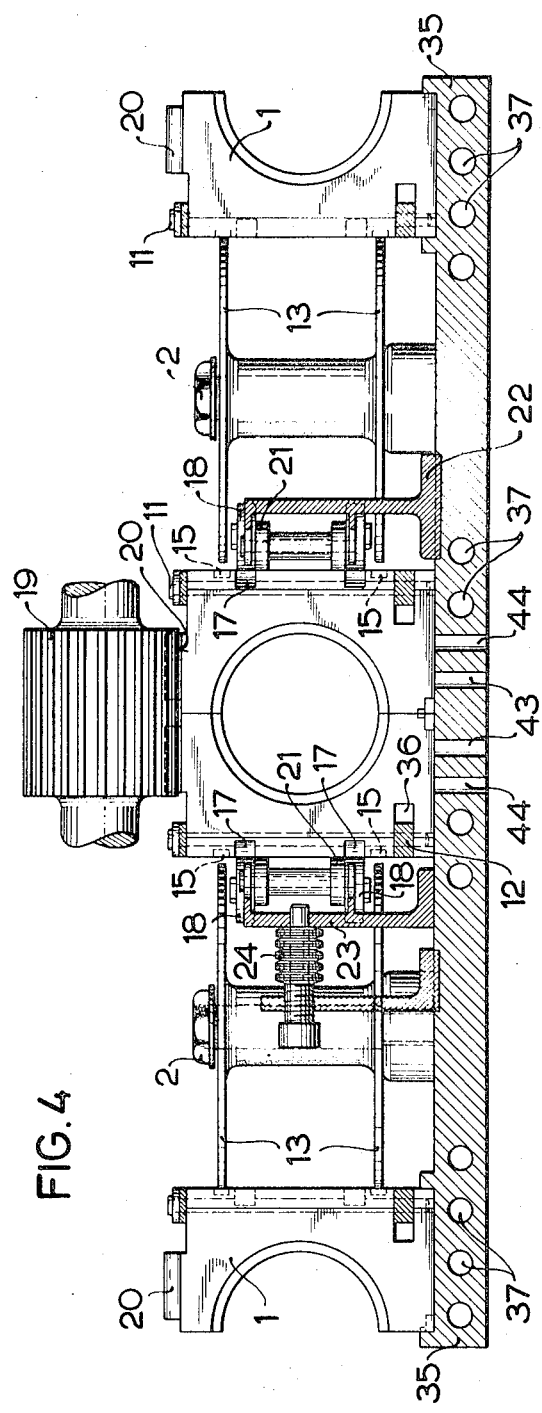
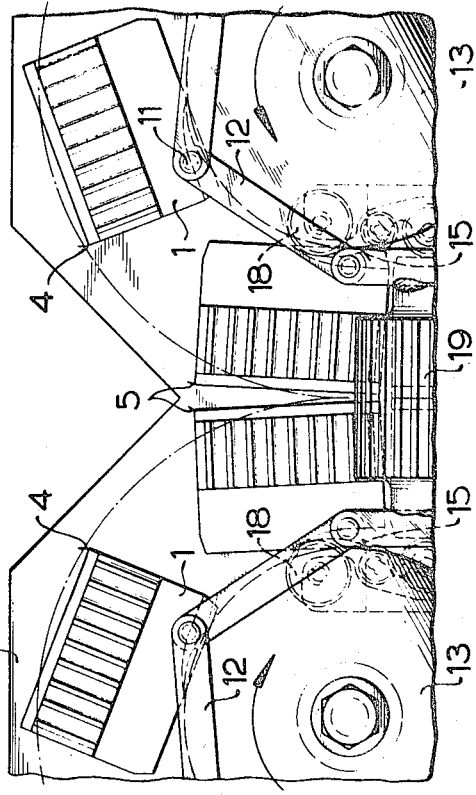
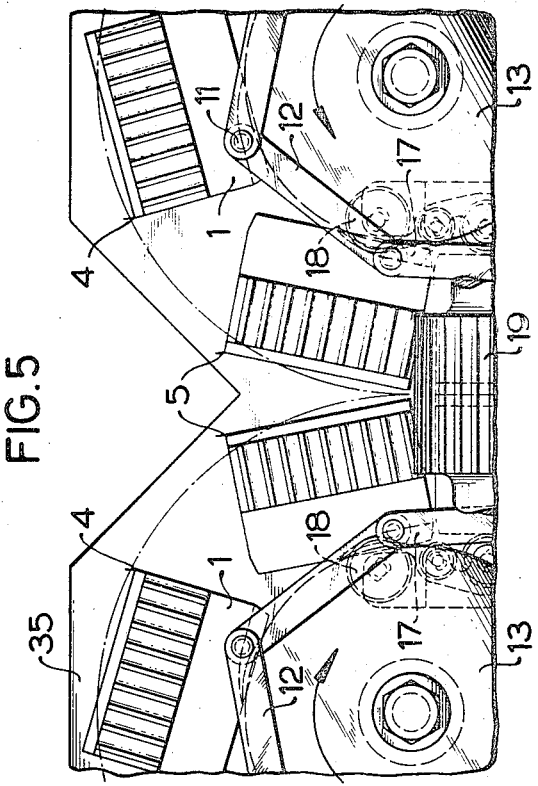

APPARATUS FOR THE MANUFACTURE OF PLASTIC TUBING OF SPECIAL CROSS-SECTIONAL CONFIGURATION

This invention relates to transversely corrugated thermoplastic tubing. It more particularly refers to an improved method of making such transversely corrugated tubing and to improved apparatus therefor.

Plastic tubing of special cross-sectional configuration, especially tubing with transverse annular or helical corrugations, is manufactured as a rule on apparatus in which molds halves which combine to form a longitudinally divided hollow mold are carried in a circulatory movement. The tube that is to be provided with the special cross-sectional profile is extruded from an extruding machine and runs from this machine into the mold train where it is pressed into the molds either by internal air pressure or by an external vacuum. After the tube has sufficiently hardened within the molds to be dimentionally stable, the mold halves open and return along appropriate paths back to the starting point.

In the embodiment of this process in which the pressing of the tube into the molds for shaping is accomplished by internal air pressure, the extruder head has to extend into the mold train, whereas in the case of external vacuum operation it is possible to let the extruded tube run into the mold train in an unsupported, hot, plastic state, for a short distance from the extruder head to the point of closure of the mold train. In both cases, however, it is desirable to keep the distance between the extruder and the point at which the molds completely close on the extruded tube as small as possible in order; in the case of internal pressure operation, to make the tube that extends into the mold train as short as possible to prevent trouble due to vibrations and to temperature fluctuations at the point of emergence of the plastic, and, in the case of external vacuum operation, to prevent any sagging of the heat-softened plastic tube as well as any chilling thereof due to extraneous influences, in the area between extrusion and hardening of the tube.

Apparatus are known in which the molds are carried without being connected to one another, and others are known in which the molds are joined to one another by links and guided by sprockets in the manner of the tread of a tractor or other track-laying vehicle. In both cases, the pivoting of the molds out of their return path into the molding path in which they are closed, and the shaping of the tube, are performed on arcuate repeating courses. If the molds are guided so that they are oriented tangentially to the arcuate guidance path with their centers contiguous with this path, the point at which the molds close cannot be ahead of a line joining the centers of curvature of the two arcuate paths on which the molds move into the molding path. As a matter of fact, it is usually even appreciably behind this line, because after the molds are pivoted into alignment with the molding path, they still have to be moved into a position parallel to one another and must also be moved toward one another in order for them to close completely. The reason for the necessity of this parallel displacement lies in the fact that the distance from the point of tangency of the mold halves on their arcuate path to the forward inside corner is greater than the height of the mold, so that if the molds should pivot simultaneously into the final path, they would first interfere with one another at these corners.

It is in the prior art to reduce, insofar as possible, the distance between the closing point of the molds and the extruder by using, at the entrance end of the train, pulleys, sprockets or tracks having the smallest possible radius. This however, creates certain difficulties, because on the one hand the mold halves have to be relatively short if they are to be able at all to travel on paths of a small radius, and on the other hand the difficulty mentioned previously, that the molds must not collide at their forward corners due to the slanting position they assume when turning in, becomes greater as the radius of curvature diminishes.

It is in the prior art to eliminate or reduce this difficulty by giving the molds a certain amount of free play in the chain by providing elongated holes in the links, and the mold members are guided by additional guiding tracks in such a manner, that when they pivot inwardly, they are lifted from the pulley or from the teeth of the sprocket which simultaneously serves as the drive sprocket. At the same time the points of the forwardly directed end face, i.e., especially the inside front corner of the mold, passes through an arc with a larger radius than the points of the rear end face, so that the mold halves enter the molding path first in a greatly skewed position and are then swung into the closed position by an additional guiding means. In this arrangement, the radii of the arcs on which the mold halves enter can be relatively small, but here again the closing point is only slightly ahead of the line connecting the centers of the curves.

The problem then is to reduce the distance between the closing point of the mold halves and the extruder by locating this closing point ahead of the line connecting the centers of the arc on which the mold halves are pivoted into the molding position.

It is therefore an object of this invention to provide a novel mold half guide means and track to solve this problem.

It is another object of this invention to provide a novel means of combining and closing revolving mold halves on an extruded thermoplastic tubing.

It is a further object of this invention to provide a novel means for reducing the distance between the extrusion of a tube of thermoplastic material and the closing of mold halves thereon.

Other and additional objects of this invention will become apparent from a consideration of this entire specification including the claims and the drawing hereof.

In accord with and fulfilling these objects, one aspect of this invention resides in carrying out the above described molding operation in such manner that when the individual mold halves are pivoted into the straight path, that is the path on which they will mold the extruded thermoplastic tubing, the points of the rear end face of the mold halves move on arcuate paths of a greater radius of curvature than do the corresponding points of the leading end face of the mold halves. Operating in this manner makes it possible for the mold halves to recycle through arcs of relatively great radii of curvature as compared to the radii of such recycle arcs in the prior art, thereby making it possible to use relatively long individual mold halves.

The mold halves according to a first embodiment of this invention, can be carried in guiding tracks in a known manner, but each mold half has a front and a rear guiding member respectively and these guiding members, at least when progressing about the final recycle are into the molding path and are guided by different independent guiding means such that the rear guiding means runs on a track of greater radius than does the front guiding member whereby causing the rear and front of the mold halves to run in greater and lesser respectively radii of curvature.

In an apparatus according to a second, especially advantageous embodiment, in which the mold halves on each side of the thermoplastic tube respectively are connected together in the manner of the tread of a track-laying vehicle, and the recycling of the mold halves is performed by pulleys or sprockets, the arcuate recycling movement is achieved according to this aspect of this invention by disposing the points at which the links of the "tread" are attached to the mold halves ahead of the center of the mold halves in their direction of movement. It is preferred to dispose these link attachment points as close as possible to the plane of the leading end face of the mold halves. Since, in this case, the rear portion of the mold half extends along the tangent to the arc farther beyond the point of tangency with the "tread" (pulley or sprocket) than does the front portion of the mold half this rear portion also passes through an arcuate path having a greater radius of curvature than does the front portion. In order to achieve a reliable and precise guidance of the mold halves, the mold halves have recesses in their surfaces which contact the pulleys or sprockets. The radius of curvature of these recesses is equal to or slightly smaller than the radius of curvature of the outside surface of the pulley or sprocket. These recesses are preferably located adjacent the points at which the links are attached to the mold halves. The apexes of these recesses are preferably located slightly to the rear of the points at which the links are attached together because this results in a more secure guidance of the mold halves.

If the point of tangency between the mold halves and the arcuate recycle path is located coincident with the front end face of the mold half, the mold half can easily pivot into the molding path and the mold halves can immediately be closed tightly. While the above considerations are theoretically accurate, as a practical matter construction requirements dictate that this point should be located somewhat rearward of the front end of the mold half in which case the leading corners of the mold halves would interfere with one another when they pivot inwardly. To prevent this, the mold halves have to be guided so that a slightly larger gap is provided between two mold halves just swinging into the molding path, i.e., so that the mold halves do not interfere with one another in moving along their guidance path. Therefore, in order to close the mold halves as guickly as possible, the mold halves have additional recesses on their pulley facing sides which extend from the leading end of the mold halves to the end of the recesses provided for the pulleys, and are engaged by a guiding member which causes the mold halves to close. This guiding member is preferably a roll whose circumferential surface is in substantially the same plane as the circumferential surfaces of the pressure rolls by which the mold halves are pressed together in known manner when they pass through the molding path.

These pressure rolls are advantageously mounted in a fixedly disposed guiding rail on one side, and in a movable, spring-biased guiding rail on the other side. It is possible to dispose an adjustable contactor on the movable guiding rail which is adjustable by an adjusting screw in such a manner that a signal is given or the apparatus is stopped as soon as and if the mold halves fail to juxtapose snugly together. Therefore, if for instance, the thermoplastic tubing is pinched between the rapidly closing mold halves, or if a foreign body gets between the mold halves, the trouble can immediately be detected and eliminated. This is important because on the one hand, if the mold halves do not pass through the molding path in the proper position, juxtaposed tightly together, they can be damaged and, on the other hand if the mold halves are not juxtaposed snugly together, air leakage can occur so that perfect shaping of the thermoplastic tubing cannot be obtained and the resultant pipe may contain flaws.

In the pivoting movement the individual mold half does not move at uniform velocity but is momentarily accelerated. To permit this acceleration to take place, the links joining the mold members together are provided with elongated apertures which are of such a size that the end faces of the mold halves will be in contact with one another within the molding path, but during the pivoting action the distances between the linkage points of the molds will be slightly increased. In order that the leading end faces of the mold halves may fit snugly together within the molding path, they can be driven at the head of the molding path by pinions. It is in the prior art, in apparatus in which mold halves are not joined to one another, to provide teeth on the outer side of each mold half, which are engaged by a pinion drive. In this known system two pinions are required which must be precisely adjusted and which must run in precise synchronism. In the case of mold halves which are linked together in the manner of the tread of a track laying vehicle, the provision of teeth on the back side thereof creates difficulties. The driving is therefore preferably performed by a pinion which engages the teeth on a side surface of the molds. This has the advantage that only one pinion is necessary. This single pinion engages both halves of the mold simultaneously, so that they are always propelled in perfect synchronism. This arrangement, however, has the disadvantage that the drive is asymmetrical and tends to force the mold halves forward so that the trailing ends thereof tend to rise from the guiding track. The tipping of the mold halves in this manner is possible in the apparatus of the invention because the links are provided with longitudinal apertures, which permit the molds to tip against one another. Such tipping can be prevented by situating the links joining the molds chain-wise in recesses on the rear side of the molds with as little clearance as possible so as to provide firm guidance for the mold halves.

If pipes of relatively large diameter are being manufactured, so that the mass of the mold halves is relatively great, and especially in the manufacture of tubes from plastics having relatively poor thermal conductivity and a wide softening range—polyolefins for example—in which case a large amount of heat has to be removed therefrom, it is often difficult to chill the molds so quickly that the molded and shaped tube or pipe hardens quickly enough to be able to be stripped from the molds. The length of the molding path from the entrance to the exit is thus determined by how long it takes for the particular plastic to cool to the temperature at which it is self-supportingly dimentionally stable. In the apparatus known hitherto, the molds are usually cooled by contact with a base plate on which they move, which base plate is cooled with a suitable coolant. The transmission of heat from the molds to the base plate is however, impaired by the fact that there is generally an oil film between the molds and the base plate. Attempts have been made to cool the molds faster by blowing cooling air on them and/or by spraying them with water. This additional cooling however, has not been found to be satisfactory.

In the apparatus of the invention a far better cooling of the molds is achieved by circulating a coolant through the mold halves while they are running through the molding path. The coolant is suitably fed to the mold halves through apertures in the base plate. In the prior art apparatus, in which the thermoplastic tube is shaped by sucking air from the molds, it is usual for an initial aspiration to be performed at the point at which the shaping is performed, and then a second aspiration is performed, by which the still plastically deformable pipe is held to the closed molds until it has hardened. In this second aspiration, since substantially no air flows, a relatively high vacuum can be achieved, although a pressure difference of less than half an atmosphere suffices for the holding of the pipe in this position. This circumstance can be exploited for cooling the molds by feeding the coolant through holes in the molds to the passages through which the air is aspirated from the molds. In order that the vacuum necessary for holding the tube tightly against the mold wall may be maintained in spite of the introduction of the coolant, it is desirable to provide a pressure reducing valve in the coolant delivery line. This has the advantage that while the coolant is passing through the mold it is subjected not to pressure but a vacuum, so that it does not escape from the molds at any leakage points.

Understanding of this invention will be facilitated by reference to the drawing in which:

FIG. 2 is a top view of the entrance end of the mold train;

FIG. 3 is a top view of the exit end of the mold train;

FIG. 4 is a section taken along the line IV—IV in FIG. 2 looking in the direction of the arrows;

FIG. 5 is a partial top view corresponding to FIG. 2 with the molds in a different position;

FIG. 6 is a partial top view similar to FIG. 5 with the molds in a further advanced position;

Figure 1:
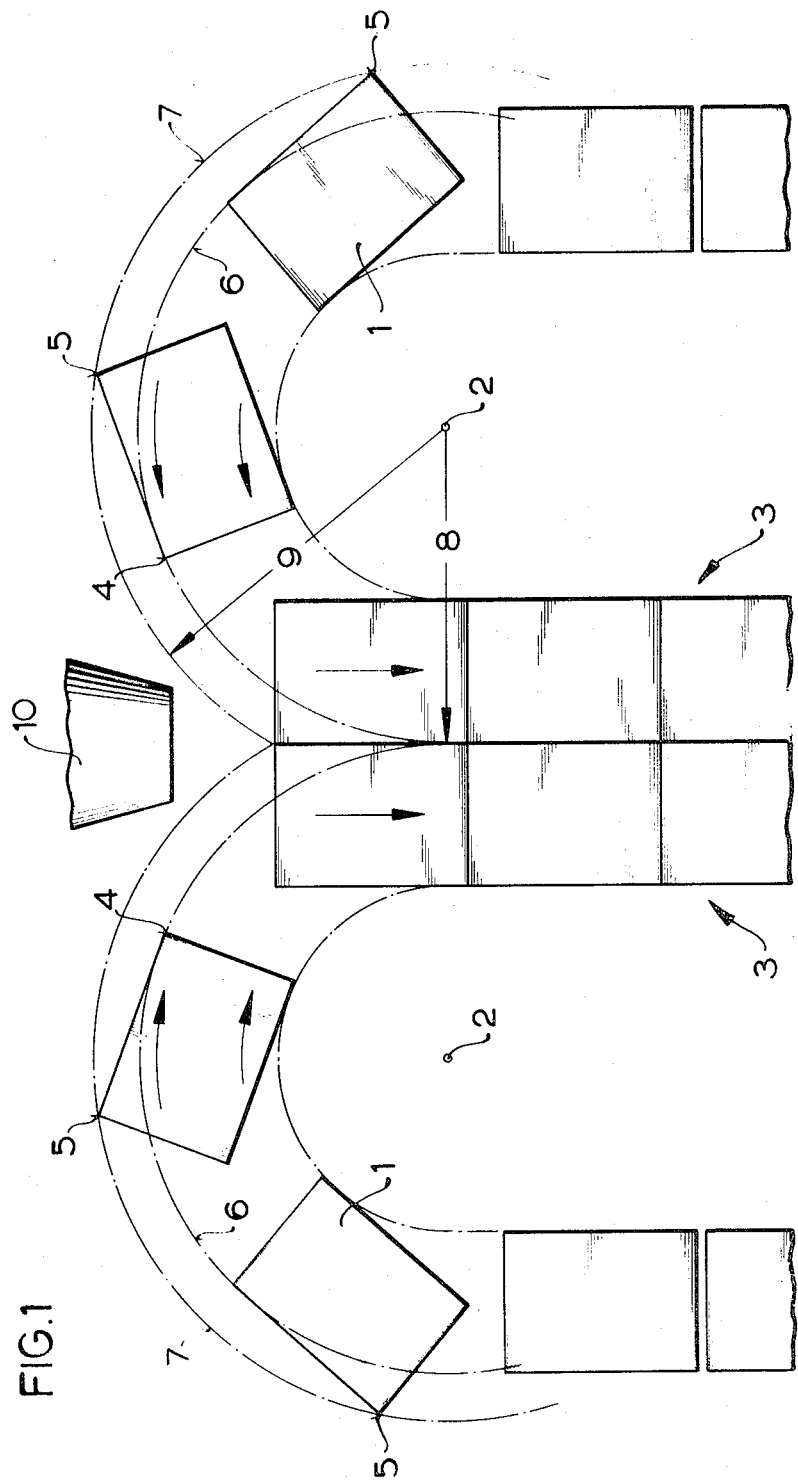
FIG. 1 is a plan schematic view of the process and apparatus of this invention.

Referring now to the drawing and particularly to FIG. 1 thereof, the mold halves 1 are delivered through arcuate (simicircular) paths, having centers of curvature 2, into the molding path 3. The leading outside corner 4 of each mold half moves along an arcuate path 6, while the trailing outside corner 5 moves along an arcuate path 7 whose radius of curvature 9 is greater than the radius 8 of arc 6. As can be seen in FIG. 1, the differences in the radii of curvature are due to the fact that the radius of arc 6 corresponds to the distance 8 between the outside corner 4 of the mold half and the curve center 2, while the radius of arc 7 corresponds to the distance 9 between the trailing outside corner 5 and the curve center 2 during pivoting. FIG. 1 illustrates that in this manner the point at which the mold halves close is suitably situated substantially forward of the line joining the centers of curvature 2, with relation to the extruder 10. It does not matter whether the mold halves are guided by pulleys or sprockets or by guiding tracks, for in any of these cases, the mold halves can be made to pass through the positions represented in FIG. 1 during the pivoting action, in which the trailing outside corners 5 are always farther out than the leading outside corners 4.

In the apparatus shown in FIGS. 2 to 11, the mold halves 1 are joined together by links 12 in the manner of the tread of a track laying vehicle. At the entrance end of the apparatus shown in FIG. 2, the mold halves 1 are guided by infeed pulleys 13 from the return paths 14 into the molding path 3. The infeed pulleys 13 have a groove in their center, so that only the upper and lower flanges of each pulley 13 serve for the guidance of the mold halves.

Each mold half has on its side facing the infeed pulley, at the level of the flanges of the infeed pulley 13, an arcuate recess 15 whose radius of curvature is equal to or slightly smaller than the radius of the infeed roll 13. The link pins 11 of the mold halves through which the links 12 are fastened not only to the mold halves but also to each other, are located adjacent the recesses 15, and slightly ahead of the apex of the recess 15 in the direction of movement of the mold halves. Each link 12 is provided at least at one end with an elongated aperture of such a size that the distance between the end faces of successive mold halves can vary from 0 to a clearance 16 which will further be discussed below.

In the sides of mold halves 1 which face the infeed pulleys 13 there are provided additional recesses 17 which begin at the end face and end with a slight curvature such that they terminate substantially at or near the same point at which the recesses 15 also terminate. These recesses are engaged by closing rolls 18 which, as shown in FIG. 4, are disposed between the flanges of the infeed pulleys 13 in such a position that, as soon as the molds have reached the position shown in FIG. 2, in which the closing rolls 18 are just leaving the recesses 17, the mold halves snugly contact one another.

To guide the molds along the molding path 3, guiding rolls 21 are disposed on both sides of the molding path and press the mold halves tightly together. For this purpose the rolls 21 on the right side as shown in FIG. 2 can be disposed on a stationary guiding rail 22, whereas those rolls 21 shown on the left side in FIG. 2 are disposed on a movable guiding rail 23 which is biased by springs 24 against the molds running through the molding path. The molds must engage one another tightly, especially when the vacuum method of operation is used. To permit the immediate signaling of trouble, which can be produced, for example, by some plastic or foreign body getting between the mold halves, a contactor 25 with an adjusting screw 26 is suitably provided at the beginning of the molding path. The adjusting screw is adjusted so that a signal is immediately given and the apparatus is shut down whenever the molds passing this point are not snugly juxtaposed. Teeth 20 are provided on the top of the molds which are engaged by a pinion 19, serves to drive the molds running through the molding path.

At the outfeed end, represented in FIG. 3, the mold halves 1 pass over the return pulleys 27 into the return paths 14. Before reaching the return pulleys, the mold halves 1 move apart while maintaining parallelism with respect to each other by the action of a wedge 28 which engages the ramps 29 on the mold halves in order to strip them from the cooled molded plastic tube. At the same time, the spacing of the bolts 11, which are connected to succeeding mold halves by links 12, increases, which is possible because, as previously stated, at least one of the fastening apertures in the links is elongated.

The driving of the entire apparatus is performed exclusively by the pinion 19. It is therefore apparent that the molds are pushed along the molding path 3, but are pulled along the return path 14 and when they run over the infeed pulleys 13. When they run over the return pulleys 27, the movement changes from pushing to pulling, whence the great return clearance 30 changes to a small clearance 31 when the mold runs onto the return pulley 27. In order to enable this return clearance to be properly adjusted, the return pulleys 27 are mounted in a longitudinally displaceable and adjustable manner in elongated apertures 32.

Figure 7:
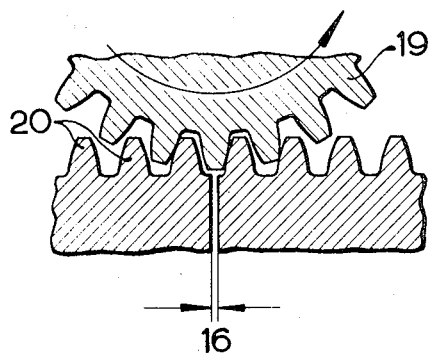
FIG. 7 is a partial sectioned view through a drive pinion and the driven mold halves of this invention.
Figure 8:
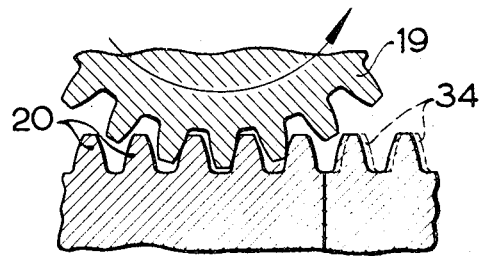
FIG. 8 is a partial sectioned view similar to FIG. 7 with the mold halves in a different position.

Since the drive pinion 19, which engages the teeth 20 on the upper side of the molds, pulls the mold halves over the infeed pulleys 13 and pushes them into the molding path 3, the molds reach the beginning of the molding path with a mold clearance 16, as shown in FIG. 7. To assure a frictionless rolling of the pinion on the mold teeth, allowance is made for this mold clearance in the teeth on the molds. i.e., the beginning and end of the toothing is shortened by one half of the clearance at the sealing faces of the molds, as represented by broken lines in FIG. 8 on the teeth 34.

As soon as the first tooth of the next succeeding mold is engaged by the drive pinion 19 and upon the drive pinion clearing the preceding mold, the mold clearance 16 closes, and the end faces of the succeeding molds move snugly together. This sealing action, as already mentioned, is important in the vacuum process because even a slight clearance or a slight canting could appreciably impair the vacuum. In the case of internal pressure operation this sealing is of no particular importance.

Figure 9:
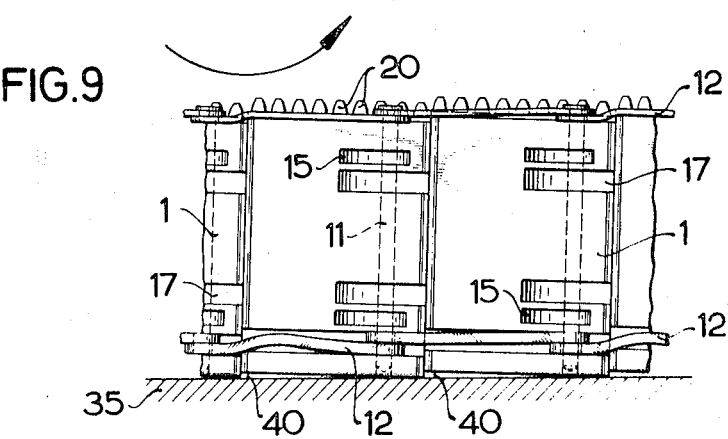
FIG. 9 is a partial plan view showing tipping of the molds because of insufficient guidance.
Figure 10:
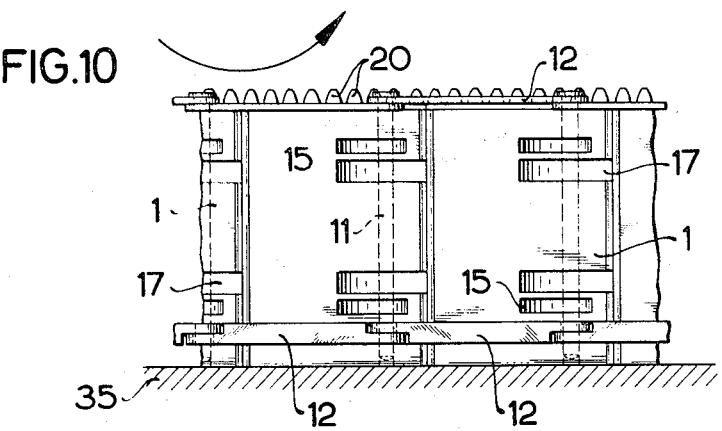
FIG. 10 is similar to FIG. 9 showing the molds secured against tipping by good guidance.

Since the driving by pinion 19 is applied to the top of the molds 1, while the molds move on the base plate with an appreciable frictional resistance, the molds tend to tip forward. This is represented diagrammatically in FIG. 9. Such tipping produces rearwardly expanding gaps 40 between the bottoms of the molds and the base plate 35 through which air can penetrate. Such tipping would therefore appreciably impair the vacuum. To prevent this, the lower links 12 are located in recesses 36 (FIG. 4). At the two extremities, the links 12 are thinned by one half, and the recesses are so matched to the thickness of the links that substantially no clearance is present between the link and its recess in the vertical direction. Therefore, as seen in FIG. 10, the molds are prevented from tipping and bending the links, as shown in FIG. 9. The upper links 12 lie on the tops of the molds, that is, they are not guided in recesses, although of course the upper links, too, can be placed in matching recesses if desired.

The entrance of the mold halves into the molding path 3 takes place as shown in FIGS. 2, 5, and 6.

When the mold halves enter, their recesses 15 are in engagement with the flanges of the infeed pulleys 13 and are pulled by the links 12 of the preceding mold half.

Since in that case appreciable friction resistance between the mold halves and the base plate 35 must be overcome, the mold halves are tightly pressed against the infeed pulleys 13. Shortly before reaching the position represented in FIG. 5, the mold closing roll 18 enters into the recess 17. This recess is sufficiently deep so that the entry of the roll 18 into the recess has no appreciable effect on the mold half 1. As soon as the position represented in FIG. 5 is reached, the mold closing roll 18 runs onto the curved portion of the recess 17 and forces the trailing end of the mold half 1 to pivot inward and at the same time to move slightly away from the infeed roll 13. This phase of movement is represented in FIG. 6. The distance between the infeed rolls 13 is such that, without the mold closing rolls 18, the confronting faces of the mold halves would not quite touch one another. This clearance is necessary to prevent the leading outside corners 4 of the molds from colliding before closure is achieved. In the position of the entering mold halves shown in FIG. 6, the mold halves are not yet entirely closed, and it can be seen that, as the mold halves continue to advance, when the mold closing rolls 18 reach the ends of the recesses 17, the two mold halves 1 will also engage one another. Immediately after this position of the mold halves is reached, the closed mold halves as can be seen in FIG. 6, pass beneath the drive pinion 19 and are pushed against the preceding pair of mold halves as shown in FIG. 7. The acceleration which the mold undergoes when the mold closing roll 18 reaches the curved end of the recess 17 is propagated through the links 12 to the following molds and is taken up by the mold clearance in the return path 14.

For the cooling of the base plate and simultaneously therewith the molds, passages 37 are provided, through which a coolant, preferably cold water, can be circulated. To permit the molds to be still more intensively cooled, a coolant can be circulated through the molds themselves.

Figure 11:
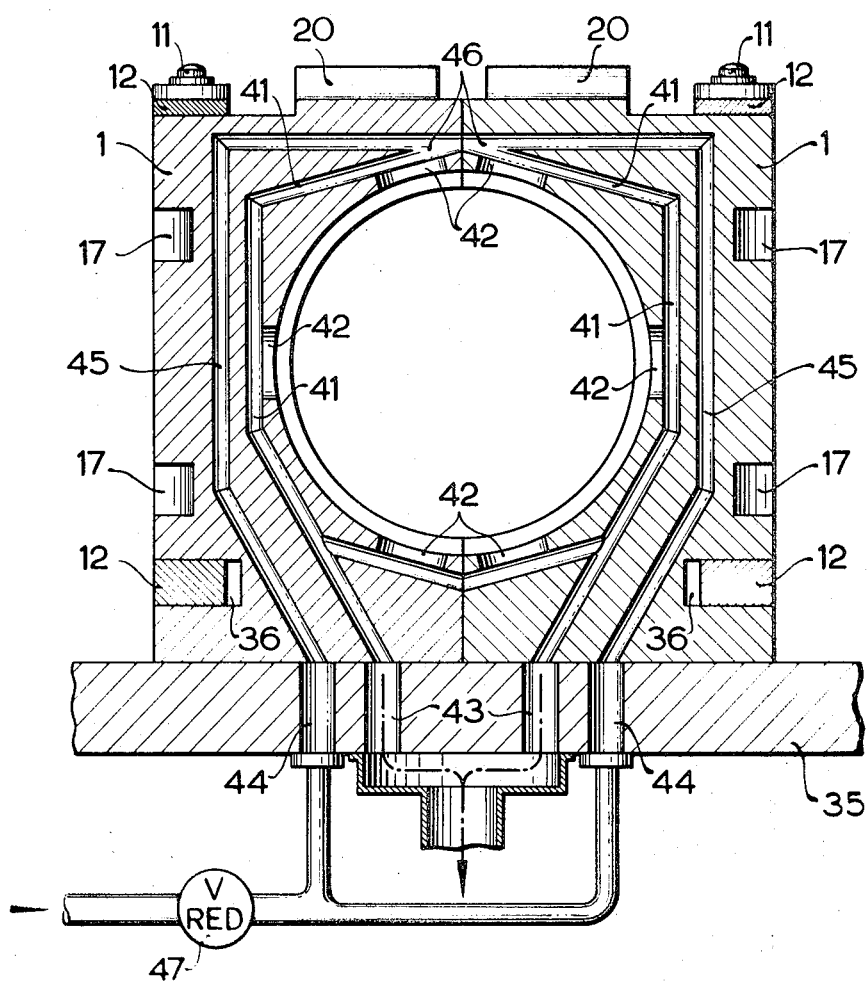
FIG. 11 is an end view partially in section through the molding path.

FIG. 11 shows a cross section through the base plate and the molds, wherein the molds as well as the base plate are equipped with such a cooling system. In the molds there are provided, in a prior art manner, passages 41 which communicate with the interior of the molds through a plurality of slots 42. Air can be aspirated through bores 43 in the base plate 35 out of the bores 41 and hence out of the interior of the molds. After the molds have passed one portion of the molding path in which the molding is performed, they reach the point at which additional bores 44 are provided in the base plate 35. Additional passages 45 in the molds communicate with these bores 44, and they also communicate at 46 with the system of passages 41. A coolant, especially water, is introduced into the system through bores 44 by means of a reducing valve 47, passes through passages 45, 46 and 41, and is discharged at 43 together with the aspirated air to a vacuum pump. While the coolant is passing through the molds it is under a considerable vacuum, which not only has the advantage of preventing the coolant from escaping through any leaks in the system, but also offers the additional advantage that the coolant is partially evaporated as a result of the vacuum, thus intensifying the cooling action through the heat of evaporation. In this manner, it is possible to chill the molds rapidly so that the molding path can be made appreciably shorter. To assure that all of the coolant is thoroughly removed from the molds before they enter the return path, it is desirable to arrange the bores or slots 44 so that they terminate in the base plate 35 in advance of the bores or slots 43 through which the air is aspirated.

As can be seen in FIGS. 1 and 2, the point at which the molds are fully closed is located, in contrast to systems of the prior art, considerably forward of the line joining the centers 2 or the axes of rotation of the infeed pulleys 13; this makes it possible to bring the extrusion die closer to the molding apparatus. For this purpose a cutaway 39 is provided in the base plate 35 to accommodate the extrusion die.

The shorter the distance is from the extrusion die to the point in the mold path at which the molding is performed, the more simple the extrusion dies can be manufactured and the more accurately the temperatures can be maintained which are necessary for the molding operation. This is especially important in the manufacture of plastic pipes of relatively large diameter and in the manufacture of laminated pipe in which a dual extrusion die is used, the one die being located within the molding path and the other being located outside of it.

What is claimed is:

1. In an apparatus for forming transversely corrugated thermoplastic tubing which comprises tubing extrusion means; at least one pair of mold halves, a molding path aligned with said extrusion means, recycling path means partially aligned with said molding path through which each of said mold halves leaves said molding path at a point distant from said extrusion means and reenters said molding path at a point closer to said extrusion means including means for guiding each mold half on an arcuate path immediately preceding said molding path reentry, and means for closing said mold halves about a thermoplastic tubing extruded from said extrusion means; the improvement which comprises means for guiding each mold half about said arcuate path in such manner that the outer forward edge of said mold half defines a curve with a smaller radius than the radius of the curve defined by the outer rearward edge of said mold half and means for closing the halves of the pair of mold halves together while the leading portion of the mold halves is passing a line drawn between the centers of curvature of said arcuate paths.

2. An improved apparatus claimed in claim 1 including a multiplicity of mold half pairs divided into right mold halves and left mold halves respectively.

3. An improved apparatus claimed in claim 2, wherein all of said right and left mold halves respectively are joined together along a continuous curve.

4. An improved apparatus claimed in claim 3 including pulley means within each of said continuous curves engaged with said halves in a driving relation.

5. An improved apparatus claimed in claim 3 including carrier means on said recycle path means wherein each of said mold halves is joined to said carrier means at a point forward of the center of said mold halves.

6. In an apparatus for forming transversely corrugated thermoplastic tubing which comprises tubing extrusion means; at least one pair of mold halves, a molding path aligned with said extrusion means, recycling path means partially aligned with said molding path through which each of said mold halves leaves said molding path at a point different from said extrusion means and reenters said molding path at a point closer to said extrusion means including an arcuate path immediately preceding said molding path reentry, and means for closing said mold halves about a thermoplastic tubing extruded from said extrusion means; the improvement wherein there are a multiplicity of mold half pairs divided into right mold halves and left mold halves wherein all of the right and left mold halves, respectively, are joined together along a continuous curve, said apparatus comprising carrier means on said recycling path means wherein each of said mold halves is joined to said carrier means at a point forward of the center of said mold halves wherein said mold halves have recesses adjacent the point where such are joined to said carrier means which recesses are adapted to contact drive pulley means within each of said continuous curves.

7. An improved apparatus claimed in claim 6 wherein the radii of curvature of said recesses is not greater than the radius of curvature of the periphery of said drive pulley.

8. An improved apparatus as claimed in claim 6 including the apexes of said recesses are positioned rearwardly of said joining point.

9. An improved apparatus as claimed in claim 6 including second recess means disposed on the side of said mold halves directed toward said pulley means which second recess means engages with said mold closing means.

10. An improved apparatus as claimed in claim 2 wherein said mold closing means is a roller means.

11. An improved apparatus as claimed in claim 9, including third recess means disposed on the rearwardly directed end of said mold halves which third recess means engages said carrier means.

12. An improved apparatus as claimed in claim 2 including link means attaching said left and right mold halves together respectively.

13. In an apparatus for forming transversely corrugated thermoplastic tubing which comprises tubing extrusion means; at least one pair of mold halves, a molding path aligned with said extrusion means, recycling path means partially aligned with said molding path through which each of said mold halves leaves said molding path at a point distance from said extrusion means and reenters said molding path at a point closer to said extrusion means including an arcuate path immediately preceding said molding path reentry, and means for closing said mold halves about a thermoplastic tubing extruded from said extrusion means; the improvement which comprises means for guiding each mold half about said arcuate path in such a manner that the outer forward edge of said mold half defines a curve with a smaller radius than the radius of the curve defined by the outer rearward edge of said mold, said apparatus including a pair of mold half pairs divided into right mold halves and left mold halves, respectively, said apparatus including link means attached to said left and right mold halves together, respectively, wherein said links are about half as thick at their point of attachment to said mold halves as they are in other areas and wherein said links overlap each other at said point of attachment.

14. An improved apparatus as claimed in claim 11, wherein said carrier means is link means disposed in said third recesses.

15. An improved apparatus as claimed in claim 10, wherein said apparatus comprises a pair of closing rolls which urge said halves of mold pairs toward one another in closing position and said apparatus further comprises a series of opposed rolls comprising right rolls and left rolls respectively wherein one of said right or left rolls is disposed a fixed distance from said mold path and wherein the other of said rolls is spring loaded and disposed a variable distance from said mold path, wherein said spring loading is sufficient to maintain snug contact between closed mold halves, said series of right rolls and left rolls being disposed along the molding path, one series being fixedly disposed along one side and the other being mounted along the other side on a common support which is spring loaded and pressed against said mold path.

16. An improved apparatus as claimed in claim 15, including right and left guide rail means engaging said right and left roll means respectively.

17. In an apparatus for forming transversely corrugated thermoplastic tubing which comprises tubing extrusion means; at least one pair of mold halves, a molding path aligned with said extrusion means, recycling path means partially aligned with said molding path through which each of said mold halves leaves said molding path at a point distant from said extrusion means and reenters said molding path at a point closer to said extrusion means including an arcuate path immediately preceding said molding path reentry, and means for closing said mold halves about a thermoplastic tubing extruded from said extrusion means; the improvement which comprises a multiplicity of mold half pairs divided into right mold halves and left mold halves, respectively, including adjustable contactor means associated with said mold path and said mold halves operative to shut down said driving pulley in response to improper alignment of said mold halves.

18. In an apparatus for forming transversely corrugated thermoplastic tubing which comprises tubing extrusion means; at least one pair of mold halves, a molding path aligned with said extrusion means, recycling path means partially aligned with said molding path through which each of said mold halves leaves said molding path at a point distant from said extrusion means and reenters said molding path at a point closer to said extrusion means including an arcuate path immediately preceding said molding path reentry, and means for closing said mold halves about a thermoplastic tubing extruded from said extrusion means; the improvement which comprises at least one bore in the mold halves for passage of coolant therethrough and means to feed and recover coolant thereto and therefrom respectively including base plate means and apertures therein.

19. An improved apparatus as claimed in claim 18, including reducing valve means in said coolant feed means whereby coolant in said mold halves is under vacuum.

* * * * *